United States Patent [19]

Vilkomerson

[11] 4,019,818

[45] Apr. 26, 1977

[54] INTERFEROMETRIC TECHNIQUE FOR DETERMINING ULTRASONIC WAVE INTENSITY

[75] Inventor: David Herman Raphael Vilkomerson, South Brunswick, N.J.

[73] Assignee: RCA Corporation, New York, N.Y.

[22] Filed: Apr. 8, 1976

[21] Appl. No.: 675,222

[30] Foreign Application Priority Data

Mar. 4, 1976 United Kingdom ............ 08665/76

[52] U.S. Cl. .................... 356/106 R; 73/67.5 H; 356/109
[51] Int. Cl.² ................................ G01N 21/46
[58] Field of Search ............... 356/106 R, 109, 110; 73/67.5 H

[56] References Cited

UNITED STATES PATENTS

| | | | |
|---|---|---|---|
| 2,604,004 | 7/1952 | Root | 356/106 R |
| 3,716,826 | 2/1973 | Green | 73/67.5 H X |

OTHER PUBLICATIONS

Peck et al., "Wavelength or Length Measurement by Reversible Fringe Counting," JOSA, vol. 43, No. 6, pp. 505-509, June 1953.
Rowley, "Some Aspects of Fringe Counting in Laser Interferometers," IEEE Trans. on Instru. and Meas., vol. IM-15, No. 4, pp. 146-149, Dec. 1966.

*Primary Examiner*—John K. Corbin
*Assistant Examiner*—Matthew W. Koren
*Attorney, Agent, or Firm*—Edward J. Norton; H. Christoffersen; George J. Seligsohn

[57] ABSTRACT

An interferometer, that simultaneously employs two phase-quadrature reference beams of coherent light which interfere with a signal beam of coherent light reflected from a spot of a displaceable signal mirror insonified by an ultrasonic wave, permits an output signal to be derived which is proportional to the sum of the squares of the ultrasonic frequency component of the interference between the signal beam and each respective one of the reference beams. This output signal is inherently substantially proportional to the intensity of the ultrasonic wave then insonifying the spot of the signal mirror and independent of random phase drift and environmental vibrations in the interferometer. The interferometric technique of the present invention, which permits the ultrasonic wave to be in the form of pulse bursts of only a few cycles so that the output signal can be range-gated, is suitable for use in an ultrasonic-wave measurement and image display system.

10 Claims, 5 Drawing Figures

INTERFEROMETRIC TECHNIQUE FOR DETERMINING ULTRASONIC WAVE INTENSITY

BACKGROUND OF THE INVENTION

1. Field of the Invention

This invention relates to the measurement of ultrasonic waves and, more particularly, to an improved interferometric technique for providing sensitive, stable and accurate measurements of ultrasonic wave intensity.

2. Description of the Prior Art

Reference is made to copending United States patent application Ser. No. 558,468, filed Mar. 14, 1975 by Mezrich et al. (which issued July 13, 1976 as U.S. Pat. No. 3,969,578), and assigned to the same assignee as the present invention, and to U.S. Pat. No. 3,716,826, issued Feb. 13, 1973 to Green. These references disclose interferometric systems for visually displaying the two-dimensional spatial distribution of the intensity of ultrasonic wave energy passing through a predetermined area of a liquid ultrasonic wave propagation medium. The interferometers employed by these systems incorporate a displaceable signal mirror and a rigid reference mirror. The displaceable signal mirror, which is situated at the predetermined area of the propagating medium, is insonified by the two-dimensional spatial distribution of ultrasonic wave energy passing through the predetermined area. The displacement of the signal mirror at any point thereof is a measure of the intensity of the ultrasonic wave insonifying that point. Thus, the spatial distribution of the displacement amplitude from point to point over the area of the surface of the signal mirror is an analog of the spatial distribution of the ultrasonic wave energy itself over the area covered thereby.

The displacement amplitudes to be measured are extremely small. For instance, the displacement amplitude of a 1.5 MHz acoustic wave of 5 nanowatts/cm$^2$ power density is less than one picometer. Such tiny signal displacement amplitudes are many times smaller than random drift displacement due to such uncontrollable factors as air currents, thermal expansion and contraction of optical elements, etc., as well as variations from optical flatness in optical elements.

As is known, the sensitivity of an interferometer varies in a sinusoidal manner from substantially zero, when the phase difference between the two interfering output waves is either zero or $\pi$, to a maximum, when the phase difference between the two interfering ouput waves is either $\pi/2$ or $3\pi/2$. Therefore, random drift displacement, discussed above, creates a problem of relatively large random change in sensitivity, which, if not solved, prevents the measurement of the relatively tiny signal displacement amplitudes.

The aforesaid U.S. Pat. application Ser. No. 558,469 solves this problem by (1) wiggling the round-trip optical path length from the interferometer reference beam by more than one-half wavelength of the interferometer coherent light at a relatively low (25 % kHz) frequency compared to the ultrasonic wave frequency (1.5 MHz), and (2) peak detecting only the high frequency (ultrasonic wave frequency) component of the interferometer output over a time interval which is at least equal to one-half of a wiggling cycle. This provides a constant sensitivity for each successive wiggling half-period, despite any random drift that might have occurred during that half-period, so long as the ultrasonic wave energy persists for at least the duration of that wiggling half-period. Since the sensitivity is constant, the peak detected output signal always remains substantially proportional to the relatively tiny ultrasonic wave displacement amplitude.

The acoustic to optical image converter disclosed in the aforesaid U.S. Pat. No. 3,716,826 also wiggles the round-trip optical pathlength of an interferometer reference beam. However, in this case, the high frequency component is not peak detected (which always occurs at a point of maximum sensitivity regardless of just when during a wiggling cycle a point of maximum sensitivity occurs), but, instead, is demodulated to provide a detected output proportional to the average (rather tha peak) sensitivity during the wiggling cycle. Unless the dynamic random drift which occurs during a wiggling cycle is negligible, the average sensitivity is not constant, but varies from one wiggling cycle to the next. In order to reduce this variation in sensitivity, the disclosure of U.S. Pat. No. 3,716,826 suggests employing a synchronous demodulator in which the phase of the reference beam is caused to differ by 90° between each of two successive image scans of superposed fields. The display of the sum of the intensities of such successive image scans is stated by U.S. Pat. No. 3,716,826 to be a faithful analog of the acoustic field at the signal mirror.

SUMMARY OF THE INVENTION

In accordance with the principles of the present invention, the problem produced by the presence of relatively large random drift and environmental vibrations in the interferometric measurement of small amplitude displacement is solved, without wiggling, by the simultaneous, rather than serial, use of two substantially phase-quadrature reference beams. One advantage of the solution of the present invention to the problem of random drift is that an ultrasonic wave need not persist for a relatively long duration of at least one-half period of a relatively low wiggling frequency. Therefore, the ultrasonic wave energy may be applied as short pulses, each having, in theory, a duration of as little as one-half of a cycle of the ultrasonic wave, and, with available transducers, a duration of as little as 1 ½ cycles of the ultrasonic wave. This permits range gating to be employed in the signal detector to prevent the system from responding to acoustic echoes. Another advantage is that it permits a substantially invariant fixed sensitivity to be derived from the sum of the squares of the component sensitivities obtained from the respective phase quadrature reference beams.

BRIEF DESCRIPTION OF THE DRAWINGS

These and other features and advantages of the present invention will become apparent from the following detailed description taken together with the accompanying drawing, in which.

DETAILED DESCRIPTION

Figure 1:
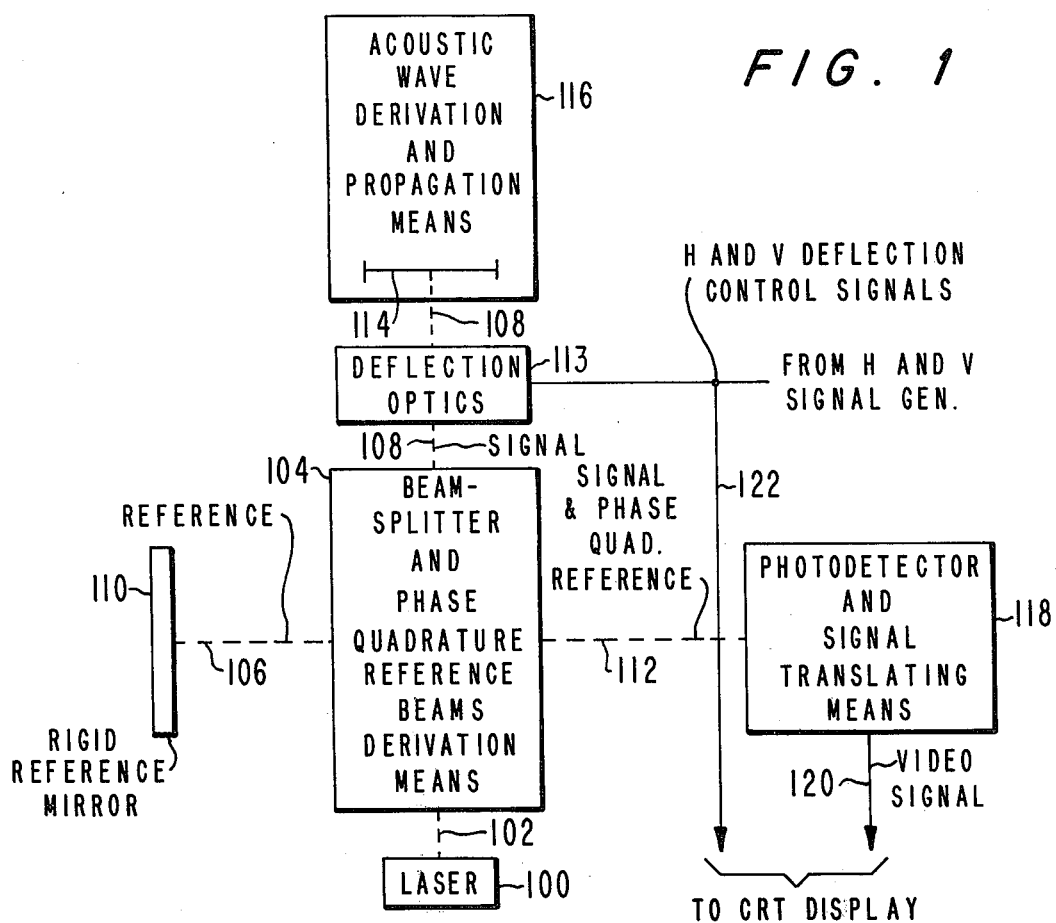
FIG. 1 is a block diagram of an ulrasonic wave imaging system incorporating the present ivention.

Referring now to FIG. 1, laser 100 generates a beam of monochromatic coherent light 102, which illuminates beam-splitter and phase quadrature reference beam derivation means 104. Two species of beam-splitter and phase quadrature reference beam derivation means 104 are described in detail below. However, from a functional point of view, beam-splitter and phase quadrature reference beams derivation means 104 serves to split the light wave energy beam 102 into two effectively coincident, or at least side-by-side, reference beams 106 and a signal beam 108. The two reference beams 106, after reflection from rigid reference mirror 110 and a second passage through beam-splitter and phase quadrature reference beam derivation 104, form two effectively coincident, or at least side-by-side, phase quadrature reference components of output beam 112. Signal beam 108, under the control of deflection optics 113 raster-scans the surface of signal mirror 114 in both the horizontal and vertical directions. Acoustic wave derivation propagation means 116 which includes a liquid acoustic wave propagation medium in which signal mirror 114 is immersed, insonifies signal mirror 114 with an ultrasonic wave field. Each point of the surface of signal mirror 114 vibrates with a displacement amplitude determined by the intensity of the insonifying ultrasonic wave field at that point.

After reflection from signal mirror 114 and a reverse passage through deflection optics 113 and beam splitter and phase quadrature reference beams derivation means 104, signal beam 108 forms a signal component of output beam 112. Output beam 112 illuminates photodetector and signal translating means 118. A preferred embodiment of photodetector and signal translating means 118 is described in detail below. However, functionally, photodetector and signal translating means 118 serves to derive a video signal output 120 which has a magnitude at any instant that is substantially proportional to the intensity of ultrasonic radiation insonifying the spot on the surface of the signal mirror 114 being illuminated by signal beam 108 at that instant.

Video signal output 120 along with the same horizontal and vertical deflection control signals 122 which control deflection optics 113 are applied to a CRT display to produce a display of the ultrasonic wave field insonifying signal mirror 114.

The detailed structure of deflection optics 113 may be substantially identical to that shown in FIG. 2 of the aforesaid U.S. patent application Ser. No. 558,468 and the detailed structure of acoustic wave derivation propagation means 116 may be substantially identical to that shown in FIG. 3a, FIG. 3b or FIG. 3c of the aforesaid U.S. patent application Ser. No. 558,468. Embodiments of beam-splitter and phase quadrature reference beam derivation means 104 and photodetector and signal translating means 118 are described below.

Figure 2A:
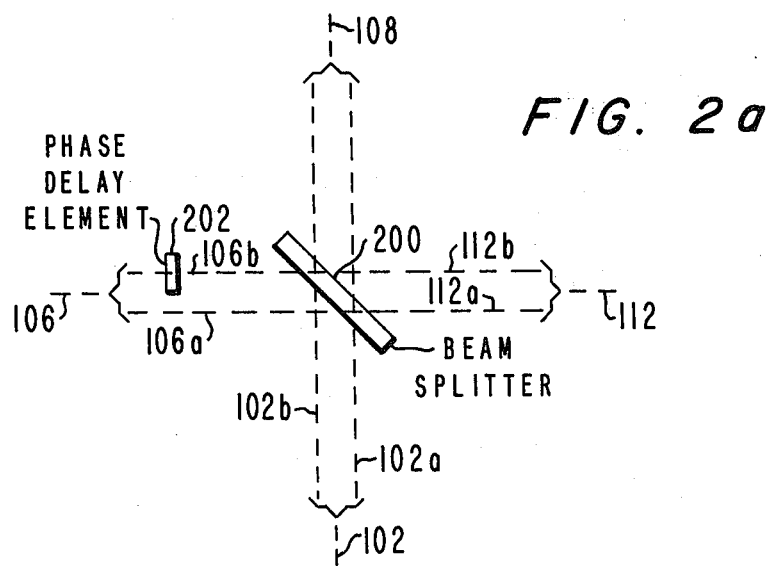
FIGS. 2a and 2b are respective first and second embodiments of the beam-splitter and phase quadrature reference beam derivation means shown in FIG. 1.

Referring now to FIG. 2a, there is shown a first embodiment of beam-splitter and phase quadrature reference beam derivation means 104. As shown, in FIG. 2a, this first embodiment of block 104 includes beam splitter 200 and λ/8 phase-delay element 202. Monochromatic coherent light 102, which has a width which extends from ray 102a to ray 102b thereof, is divided by beam splitter 200 into reference beams 106 and signal beam 108, as is conventional. Reference beams 106, as is shown in FIG. 2a, are composed of side-by-side lower beam 106a, which does not pass through λ/8 phase-delay element 202, and upper beam 106b, which does pass through μ/8 phase-delay element 202. λ/8 phase-delay element 202 is composed of a predetermined thickness of a material having a differential index of refraction with respect to air such that beam 106b in a single pass through element 202 is delayed in phase with respect to beam 206a by substantially one-eighth a wavelength of the monochromatic coherent light from laser 100. Since beam 106b, upon reflection from rigid reference mirror 110, makes a second pass through element 202, reflected beam 106b incident on beam splitter 200 is phase-delayed by a total amount of one-quarter wavelength (90°) with respect to reflected beam 106a incident on beam splitter 200.

A portion of reflected reference beam 106a, which is transmitted through beam splitter 200, together with a portion of reflected signal beam 108, which is reflected from beam splitter 200, form interfering components of output beam 112a. The portion of reflected reference beam 106b, which is transmitted through beam splitter 200, together with the portion of reflected signal beam 108, which is reflected from beam splitter 200 form interfering components of output beam 112b. OUtput beams 112a and 112b comprise side-by-side portions of resultant ouput beam 112, shown in FIG. 1.

The advantage of the embodiment of block 104 shown in FIG. 2a is its simplicity. However, in the embodiment of block 104 shown in FIG. 2a, it is assumed that the characteristics of the respective optical paths traveled by each of side-by-side reference beams 106a and 106b remain relatively constant with respect to each other (i.e., any dynamic random drift affects the two optical paths identically). To the slight extent that this assumption is not perfectly true in practice, a small, but normally acceptable error in measurement of amplitude displacement results.

Figure 2B:
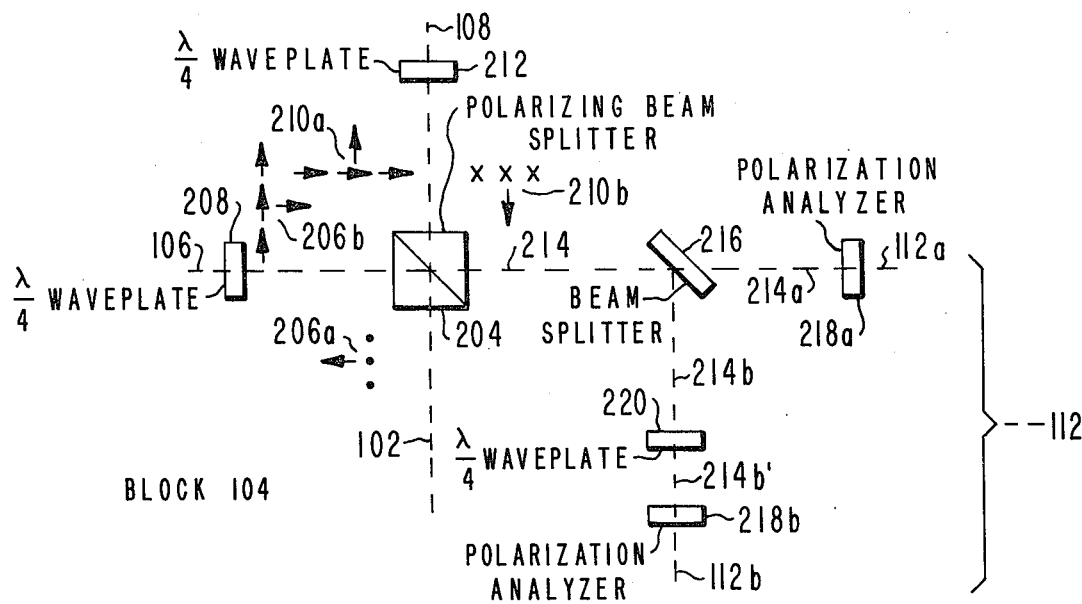

FIG. 2b shows a more complex embodiment of block 104 than that shown in FIG. 2a, but one in which it is ensured that the respective optical path lengths of the two phase-quadrature reference beams remain substantially constant with respect to each other. More specifically, in the embodiment of block 104 shown in FIG. 2b, monochromatic coherent light 102 from laser 100 is linearly polarized at an oblique angle, such as 45°, with respect to the polarizing directions of polarizing beam splitter 204. In any case, polarizing beam splitter 204 divides monochromatic coherent light 104 into a reference component emerging therefrom, which, as indicated by symbol 206a, is directed toward λ/4 waveplate 208 and is linearly polarized in a direction pointing into the paper. Polarizing beam splitter 204 further divides monochromatic light 102 into a signal component emerging therefrom, which, as indicated by symbol 210a is directed toward λ/4 waveplate 212 and is linearly polarized in a direction from left-to-right.

Reference component 206a, in passing through λ/4 waveplate 208 on its outgoing trip is converted into circularly-polarized reference beam 106. In a similar manner, signal component 210a in a passing through λ/4 waveplate 212 in its outgoing trip is converted into circularly-polarized signal beam 108. Circularly-polarized reference beam 106, after reflection from reference mirror 110, passes again through λ/4 waveplate 208. Similarly, circularly-polarized signal beam 108, after reflection from signal mirror 114, passes again through λ/4 waveplate 212. As indicated by symbol 206b, the double pass of the reference component through λ/4 waveplate 208 results in a reflected reference component which is linearly polarized in a direction pointing from bottom-to-top of the paper and is traveling back to polarizing beam splitter 204. Similarly, the double pass of the signal component through λ/4 waveplate 212 results in a signal component 210b which is linearly polarized in a direction pointing out of the paper and is traveling back toward polarizing beam splitter 204.

Thus, the double pass of the reference component through λ/4 waveplate 208 causes the direction of polarization of reflected reference component 206b to be spatially rotated by 90° with respect to the direction of polarization of outgoing reference component 206a, and the double pass of the signal component through λ/4 waveplate 212 causes the direction of polarization of reflected signal 210b to be spatially rotated by 90° with respect to the direction of polarization of outgoing signal component 210a. Therefore, substantially all of reflected reference component 206b is transmitted through polarizing beam splitter 204 to form a reference component of output beams 214 emerging from polarizing beam splitter 204. Further, substantially all of reflected signal component 210b is reflected by polarizing beam splitter 204 to form a signal component of output beam 214 emerging from polarizing beam splitter 204.

While the polarizations of the respective reference and signal components of output beam 214 are spatially in quadrature with each other, the temporal phase difference between the respective reference and signal components of output beam 214 are independent of each other. Further, this temporal phase difference dynamically varies in accordance with such factors as random drift and the ultrasonic vibration of signal mirror 114. Beam splitter 216, which divides output beam 214 into two substantially equal portions 214a and 214b, has no effect on either the relative spatial polarization orthe temporal phase difference between the reference and signal components of beams 214a and 214b. Polarization analyzer 218a, in the path of beam 214a, is preferably oriented at substantially 45° with respect to each of the spatial quadrature polarization directions of the reference and signal components of beam 214a. Therefore, the intensity of beam 112a emerging from polarization analyzer 218a depends substantially solely on the then-existing temporal difference in phase between the reference and signal components of output beam 214a.

λ/4 waveplate 220, in the path of output beam 214b, has its birefrigent axes aligned with respect to the spatial quadrature polarizations of the reference and signal components of output beam 214b to add a temporal phase delay of substantially 90° between the reference and signal components of beam 214b' emerging from λ/4 waveplate 220. Therefore, because the temporal phase difference between the reference and signal components of beam 214b is inherently substantially identical to the temporal phase difference between the reference and signal components of beam 214a, the temporal phase difference between the reference and signal components of beam 214b' is offset substantially 90° from the temporal phase difference between the reference and signal components of beam 214a. Polarization analyzer 218b, which is substantially identical to polarization analyzer 218a, derives beam 112b from beam 214b'. The intensity of beam 112b depends substantially solely on the then-existing phase difference between the reference and signal components of beam 214b'. Because the then-existing temporal phase difference is always offset by substantially 90° from the then-existing temporal phase difference between the reference and signal components of beam 214a, a signal proportional to the sum of the squares of the respective intensities of beams 112a and 112b would be independent of the then-existing temporal phase difference between the reference and signal components of beam 214a or beam 214b'. This is true because of the trigonometric identity $\sin^2 X + \sin^2(X+90°) = 1$. Beams 112a and 112b, shown in FIG. 2b, comprise output 112 in FIG. 1.

Figure 3:
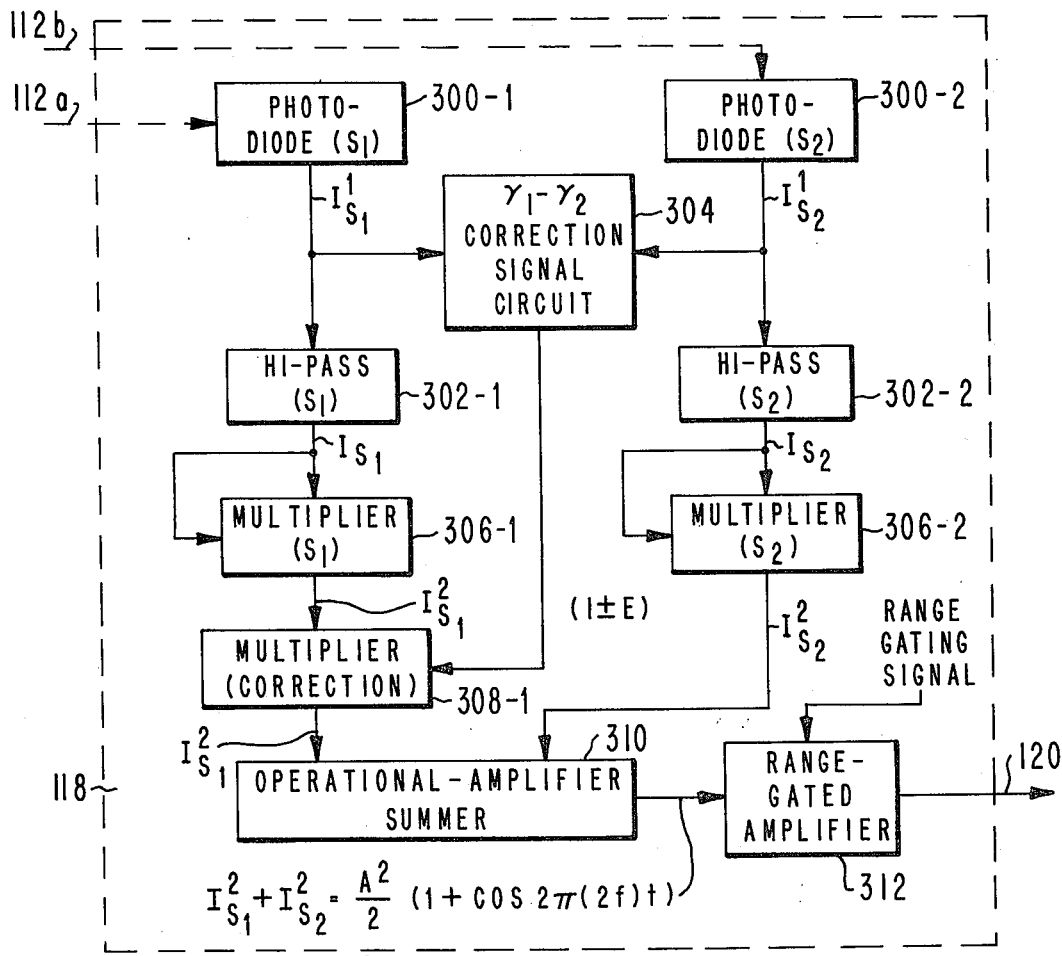
FIG. 3 is an embodiment of the photodetector and signal translating means shown in FIG. 1.

Referring now to FIG. 3, there is shown an embodiment of photodetector and signal translating means 118 of FIG. 1 for providing a signal proportional to the sum of the squares of the respective intensities of beams 112a and 112b. Specifically, photodiode 300-1 is illuninated by beam 112a from block 104 and photodiode 300-2 is illuminated by beam 112b from block 104. The output from photodiode 300-1 is a signal $I_{s1}'$ proportional to the absolute intensity (including DC, low frequency and high frequency components) of beam 112a. In a similar manner, the output from photodiode 300-2 is a signal $I_{s2}'$ proportional to the absolute intensity of beam 112b. The output from photodiode 300-1 is applied as an input to high-pass filter 302-1 which removes the DC and low frequency components of input signal $I_{s1}'$ to provide as an output therefrom signal $I_{s1}$ which is proportional to the intensity of the high frequency (e.g. 1.5 MHz) component at the ultrasonic wave frequency. In a similar manner, high-pass flter 302-2 derives an output signal $I_{s2}$ proportional to the intensity of the high frequency signal component of the output from photodiode 300-2 which is applied as an input thereto. In addition, the output from photodiode 300-1 is applied as a first input to $(\gamma_1-\gamma_2)$ correction signal circuit 304 and the output from photodiode 300-2 is applied as a second input to $(\gamma_1-\gamma_2)$ correction signal circuit 304. Circuit 304 is discussed in more detail below.

The output $I_{s1}$ from high-pass filter 302-1 is applied as both multiplier and multiplicand inputs to multiplier 306-1 and the output $I_{s2}$ of high pass filter 302-2 is applied as both multipler and multiplicand inputs to multiplier 306-2. Multiplier 306-1 and 306-2 may be standard circuits, such as circuit AD429A manufactured by Analog Devices.

In a perfectly balanced system, the average illumination of photodiode 300-1 by beam 112a would always be exactly equal to the average illumination of photodiode 300-2 by beam 112b and the detection efficiency of photodiode 300-1 would be just equal to that of photodiode 300-2. Thus, in such a perfectly balanced system, the average value of ouput signal $I_{s1}'$ from photodiode 300-1 would be just equal to the ouput signal $I_{s2}'$ from photodiode 300-2. In practice, however, the system is not perfectly balanced. Therefore, it is desirable to include a $(\gamma_1-\gamma_2)$ correction signal circuit 304 to compensate for any imbalance in the two signal channels. In its simplest form, correction circuit 304 may be a manually adjustable potentiometer which is set to provide a voltage output which differs from a predetermined voltage by an error signal which has a magnitude selected to compensate for imbalance in the two signal channels. In a more complex form, correction circuit 304 may also include feedback and/or servo means for dynamically varying the magnitude of the error signal required to maintain the effective balance between the two channels. In any case, a correction multiplier is inserted in either one of the two channels, such as multiplier 208-1 inserted in the $S_1$ channel to achieve effective balance between the two channels. Specifically, the output from multiplier 306-1 is applied as a multiplicand input to correction multiplier 308-1, while the output from correction circuit 304 is applied as a multiplier input to correction multiplier 308-1. Therefore, the respective first-channel output from correction multiplier 308-1 is maintained in effective balance with the second-channel output from multiplier 306-2. Although the presence of correction signal circuit 304 and correction multiplier 308-1 is certainly desirable, its inclusion in block 118 is not essential to the present invention.

In any event, the respective output $I_{s1}^2$ and $I_{s2}^2$ are applied as respective first and second inputs to operational amplifier summer 310. By way of example, summer 310 may take the form of circuit LH0032C manufactured by National Semiconductor Co. The output from summer 310 is equal to $I_{s1}^1 + I_{s2}^2$. By trigonometry, it can be shown that this output from summer 310 is given by the following equation:

$$I_{s1}^2 + I_{s2}^2 = (A^2/2)\,[1 + \cos 2\pi(2f)t], \qquad (1)$$

where A is proportional to the peak amplitude displacement being measured of signal mirror 114, $f$ is the ultrasonic wave frequency and $t$ is time.

Figure 4:
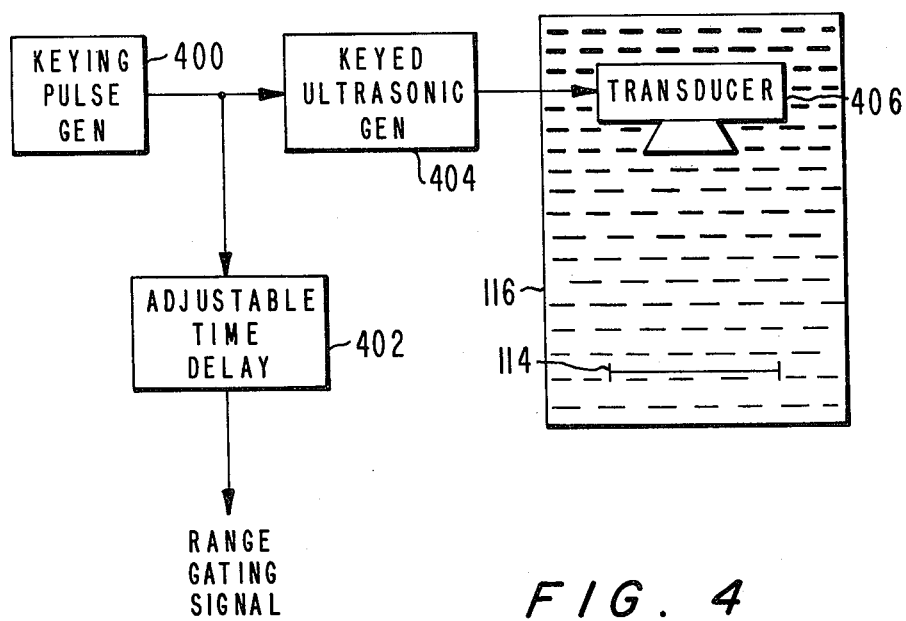
FIG. 4 illustrates means for deriving acoustic wave pulses and deriving a range gating signal for controlling the operation of the range gate shown in FIG. 3.

The output from operational-amplifier 310 may be applied to video output 120 either directly or through one or more stages of amplification. Preferably, the ultrasonic wave is in the form of short pulse bursts of only a few cycles and the output from operational-amplifier summer 310 is applied to video output 120 through range- gated amplifier 312, as shown in FIG. 3. Range gated-amplifier 312 includes a normally disabled stage, which is enabled only during the presence of a range gating signal applied thereto. As shown in FIG. 4, such a range gating signal may be derived by applying an output pulse from keying pulse generator 400 through adjustable time delay 402. The keying pulse from keying pulse generator 400 is also used to key on keyed ultrasonic generator 404, which has its output coupled to transducer 406 of acoustic wave derivation and propagation means 116. Adjustable time delay 402 is adjusted to provide a time delay which corresponds with the propagation time of the ultrasonic acoustic wave from transducer 406 to signal mirror 14, plus any time delay which occurs in block 118 in the forwarding of the signal to the input of the range-gate stage of amplifier 312. In this manner, range-gated amplifier 312 is only operative during the presence of a signal pulse and does not respond to acoustic echoes or other noise signals which may occur while the range gating signal is absent.

Range-gated amplifier 312, when enabled, may pass the entire input signal thereto or, alternatively, it may include an integrating stage which inegrates the high frequency portion of the input. Further, range gated amplifier 312 may use the average value of the DC portion of the input to provide automatic gain control. In any event, the video output on lead 120 is independent of either dynamic or static random phase drifts in the interferometer. Although, in the preferred embodiment of the invention, shown in FIG. 3, the output signal is substantially proportional to the intensity of the ultrasonic radiation field insonifying the spot of the signal mirror then being illuminated, an output signal could be derived which is substantially proportional to the peak amplitude, rather than intensity, of this field by providing additional means, not shown, for deriving the square root of the magnitude of the signal from summer 310.

What is claimed is:
1. In a system responsive to the intensity of radiated ultrasonic wave energy having a given frequency; the combination comprising:
  a. first means including photodetector and signal translating means, responsive to the simultaneous illumination thereof with respective first and second beams of coherent light of a predetermined wavelength each of which has an intensity component at said given frequency, for deriving an output signal having a magnitude in accordance with the sum of the squares of the respective intensity components at said given frequency of each of said first and second beams, and
  b. second means comprising an interferometer for simultaneously illuminating said photodetector and signal translating means with said first and second beams, said interferometer including a substantially rigid reference mirror, a displaceable signal mirror adapted to be insonified by said ultrasonic wave energy, and beam splitter and phase quadrature reference beam derivation means illuminated by said coherent light, said beam splitter and phase quadrature beam derivation means being cooperatively located with respect to said reference mirror and said signal mirror to derive as said first beam the interference between signal light reflected from an insonified spot of said signal mirror and first reference light reflected from said reference mirror that has a first temporal reference phase and to derive as said second beam the interference between said signal light and second reference light reflected from said reference mirror that has a second temporal reference phase substantially in quadrature with said first temporal reference phase.

2. The combination defined in claim 1, wherein said photodetector and signal translating means derives an output signal having a magnitude substantially proportional to the sum of the squares of the respective intensity components at said given frequency of each of said first and second beams.

3. The combination defined in claim 1, wherein said second means includes deflection means for selecting said illuminated spot of said signal mirror in accordance with at least one deflection control signal applied thereto.

4. The combination defined in claim 3, wherein said first means includes means coupling said deflection means and the output signal from said photodetector and signal translating means to a cathode-ray tube display to produce a display in correspondence with the deflection of said selected spot.

5. The combination defined in claim 1, wherein said beam splitter and phase quadrature reference beam derivation means comprises a beam splitter for dividing said illuminating light into a reference beam of a given width, which is directed to be reflected back on itself to said beam splitter by said reference mirror, and a signal beam, which is directed to be reflected back on itself to said beam splitter by said signal mirror, said beam splitter further comprising a phase-delay element in the path of only a certain portion of said given width of said reference beam for providing a respective phase delay of one-eighth wavelength of said coherent light with respect to the remaining portion of said given width of said reference beam during the respective outgoing trip of said reference beam toward said reference mirror and also during the respective incoming trip of said reflected reference beam, whereby said respective certain and remaining portions of said reflected beam returned to said beam splitter are in phase-quadrature with each other, said beam splitter combining said certain portion of said reflected reference beam with a certain portion of said reflected signal beam to form said first beam and combining said remaining portion of said reflected reference beam with the remaining portion of said reflected signal beam to form said second beam.

6. The combination defined in claim 1, wherein said beam splitter and phase quadrature reference beam derivation means comprises a polarizing first beam splitter for dividing said illuminating light into a reference beam, having a certain spatial polarization orientation, which reference beam is directed to be reflected back on itself to said first beam splitter by said reference mirror, and a signal beam having a spatial polarization orientation in quadrature with said certain polarization orientation, which signal beam is directed to be reflected back on itself to said first beam splitter by said signal miror; a first quarter-wave plate in the path of said reference beam on both its outgoing trip toward said reference mirror and on its incoming trip toward said first beam splitter, whereby said reflected reference beam returned to said first beam splitter has its spatial polarization rotated 90° from its original certain polarization orientation by its double passage through said first quarter-wave plate; a second quarter-wave plate in the path of said signal beam on both its outgoing trip toward said signal mirror and on its incoming trip forward said first beam splitter, whereby said reflected signal beam returned to said first beam splitter has its spatial polarization orientation rotated 90° from its original polarization orientation in quadrature with said certain polarization orientation by its double passage through said second quarter-wave plate; said first beam splitter combining said reflected reference and reflected signal beams into a single output beam; a non-polarizing second beam splitter in the path of said single output beam for dividing said output beam into first and second similar components, and third means comprising a first polarization analyzer in the path of said first component for deriving said first beam with an intensity which is determined by the temporal phase difference between said reflected signal beam and said reflected reference beam, said third means further comprising a third quarter-wave plate and a second polarization analyzer in the path of said second component for deriving said second beam with an intensity which is determined by the temporal phase difference between said reflected signal beam and a second reference beam which is in phase quadrature with said reflected reference beam.

7. The combination defined in claim 1, wherein said photodetector and signal translating means comprises a first photodetector for detecting said first beam and a second photodetector for detecting said second beam, and signal-translating means coupled to the respective outputs of said first and second photodetectors for deriving said output signal with a magnitude substantially proportional the sum of the squares of the magnitudes of said respective outputs of said first and second photodetectors.

8. The combination defined in claim 7, wherein said signal translating means includes a first channel including a first hi-pass filter and a first multiplier squaring circuit for deriving a first channel output which is substantially proportional to the square of the ultrasonic frequency component in the output of said first photodetector and which is independent of any DC or low-frequency random drift components in the output of said first photodetector, a second channel including a second hi-pass filter and a second multiplier squaring circuit for deriving a second channel output which is substantially proportional to the square of the ultrasonic-frequency component in the output of said second photodetector and which is independent of any DC or low-frequency random drift components in the output of said second photodetector, and a summing circuit responsive to the respective first and second channel outputs for deriving said output signal.

9. The combination defined in claim 8, wherein said signal translating means further comprises a balance-correction signal circuit coupled to said first and second photodetectors for deriving a correction signal in accordance with the imbalance which exists between the respective outputs of said first and second photodetectors, and imbalance compensating means in one of said first and second channels responsive to said correction signal for rendering the first and second channel outputs substantially independent of any imbalance in the respective outputs of said first and second photodetectors.

10. The combination defined in claim 7, wherein said ultrasonic wave energy is in the form of a series pulse bursts, each of which successively insonifies said displaceable signal mirror only during a predetermined time interval corresponding thereto, and wherein said signal translating means further includes a normally-closed range gate which is opened to pass said output signal only during the predetermined time interval corresponding to each successive burst of said series.

* * * * *